(12) United States Patent
Ulrey et al.

(10) Patent No.: US 9,951,669 B2
(45) Date of Patent: Apr. 24, 2018

(54) METHOD AND SYSTEM FOR A HC TRAP

(71) Applicant: Ford Global Technologies, LLC, Dearborn, MI (US)

(72) Inventors: Joseph Norman Ulrey, Dearborn, MI (US); Giovanni Cavataio, Dearborn, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 15/280,868

(22) Filed: Sep. 29, 2016

(65) Prior Publication Data

US 2018/0087422 A1    Mar. 29, 2018

(51) Int. Cl.

| | | |
|---|---|---|
| *F01N 3/021* | (2006.01) | |
| *F01N 3/02* | (2006.01) | |
| *F01N 3/10* | (2006.01) | |
| *F01N 3/031* | (2006.01) | |
| *F01N 3/08* | (2006.01) | |
| *F01N 13/00* | (2010.01) | |
| *F02D 41/06* | (2006.01) | |
| *F02D 9/04* | (2006.01) | |
| *F01N 11/00* | (2006.01) | |

(52) U.S. Cl.
CPC ............ *F01N 3/031* (2013.01); *F01N 3/021* (2013.01); *F01N 3/0821* (2013.01); *F01N 3/0835* (2013.01); *F01N 11/002* (2013.01); *F01N 13/011* (2014.06); *F02D 9/04* (2013.01); *F02D 41/064* (2013.01); *F01N 2560/06* (2013.01)

(58) Field of Classification Search
CPC ... F01N 3/021; F01N 9/00; F02M 26/15; Y02T 10/24; Y02T 10/47
USPC .................... 60/287, 288, 297, 299, 311
See application file for complete search history.

(56) References Cited

U.S. PATENT DOCUMENTS

| | | | | |
|---|---|---|---|---|
| 5,307,627 A | * | 5/1994 | Christensen | .......... F01N 3/0835 422/169 |
| 6,367,246 B1 | * | 4/2002 | Hirota | ................ B01D 53/9445 55/283 |
| 6,742,328 B2 | * | 6/2004 | Webb | ................. B01D 53/9431 60/274 |
| 6,745,560 B2 | * | 6/2004 | Stroia | ................ B01D 53/9431 422/169 |
| 8,448,422 B2 | * | 5/2013 | Uhrich | ....................... F01N 5/02 60/281 |
| 8,516,801 B2 | * | 8/2013 | Sano | .................. B01D 53/9495 60/287 |
| 8,789,360 B2 | | 7/2014 | Boshart | |
| 2009/0120067 A1 | | 5/2009 | Elwart et al. | |

(Continued)

OTHER PUBLICATIONS

Ulrey, Joseph Norman, et al., "Method and System for Reducing Particulate Emissions," U.S. Appl. No. 15/041,689, filed Feb. 11, 2016, 42 pages.

(Continued)

*Primary Examiner* — Patrick Maines
*Assistant Examiner* — Dapinder Singh
(74) *Attorney, Agent, or Firm* — Julia Voutyras; McCoy Russell LLP

(57) ABSTRACT

Methods and systems are provided for a HC trap in a bypass passage. In one example, a method may include closing a diverter valve to flow exhaust gas from a main exhaust passage to the bypass passage during a cold-start.

20 Claims, 7 Drawing Sheets

(56) References Cited

U.S. PATENT DOCUMENTS

| | | |
|---|---|---|
| 2009/0120071 A1 | 5/2009 | Gandhi et al. |
| 2011/0252794 A1* | 10/2011 | Lupescu ............... F01N 3/0835 60/605.2 |
| 2012/0060482 A1 | 3/2012 | Gonze et al. |
| 2013/0287659 A1 | 10/2013 | Lupescu et al. |

OTHER PUBLICATIONS

Uhrich, Michael James, et al., "Method and System for an Exhaust Catalyst," U.S. Appl. No. 15/228,538, filed Aug. 4, 2016, 51 pages.

* cited by examiner

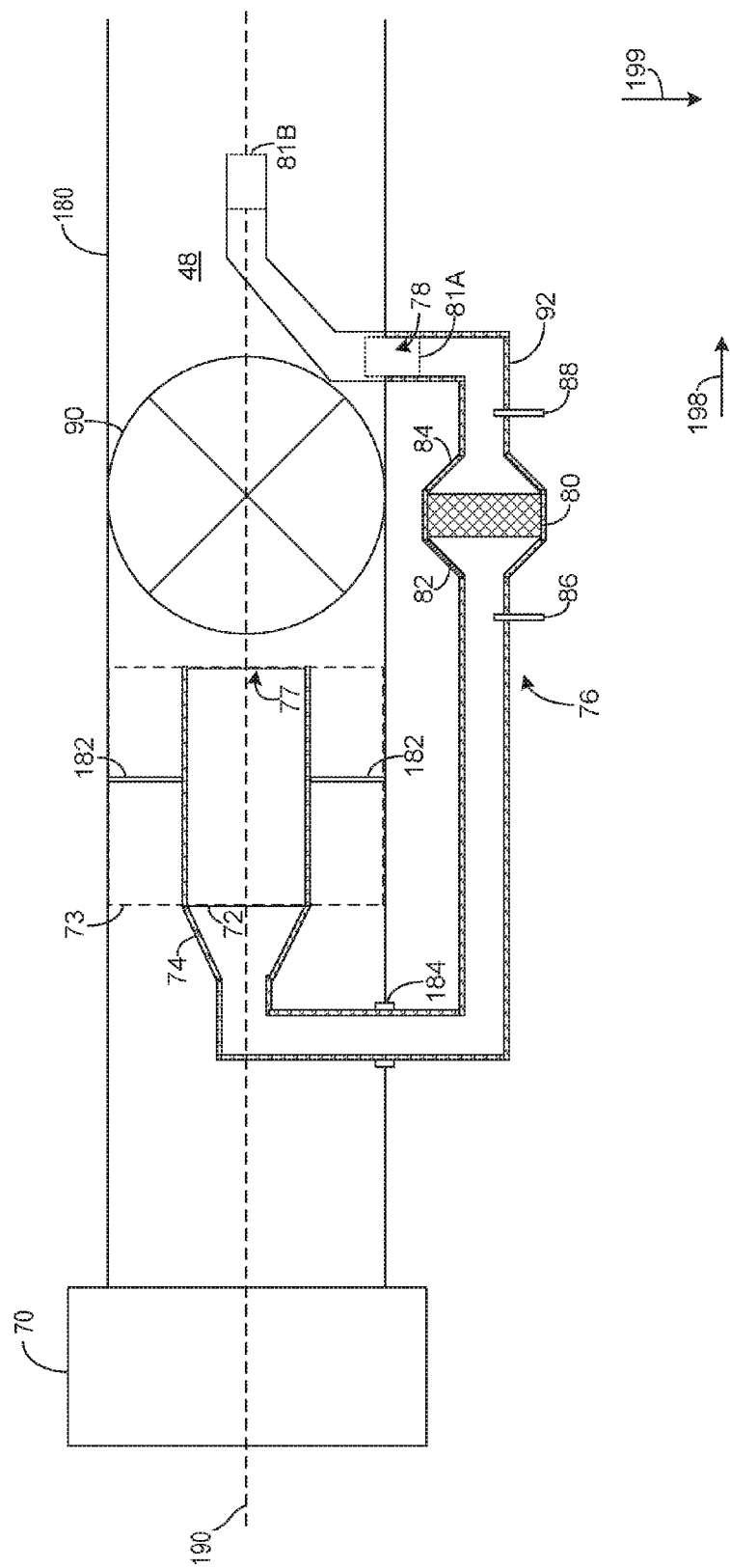

METHOD AND SYSTEM FOR A HC TRAP

FIELD

The present description relates generally to an integrated hydrocarbon trap and catalyst.

BACKGROUND/SUMMARY

In recent years, considerable efforts have been made to reduce the level of hydrocarbon (HC) emissions from vehicle engines. Conventional exhaust treatment catalysts such as three-way catalysts achieve oxidation of hydrocarbons to $CO_2$ and water and help prevent the exit of unburnt or partially burnt hydrocarbon emissions from a vehicle. However, these emissions are high during cold starting of the engine before the latent heat of the exhaust gas allows the catalyst to become active (e.g., achieve light-off temperatures).

Attempts to reduce emissions during engine cold-start may include providing an auxiliary heating device to heat the catalyst to light-off temperatures. Other attempts to address engine cold-start emissions include integrating a hydrocarbon trap (HC trap) with a catalyst. One example approach is shown by Jen et al. in U.S. 20130287659. Therein, the HC trap system is positioned in an exhaust passage. The HC trap captures HCs released during the cold-start and retains the HCs until the catalytic elements are sufficiently heated to reduce the trapped HCs.

However, the inventors herein have recognized potential issues with such systems. As one example, by placing the HC trap system in the exhaust passage, it is continually exposed to exhaust gas and combustion byproducts, which may decrease the longevity of the HC trap. Furthermore, oxidation of HCs in the presence of water is inefficient compared to oxidation in the absence of water. Additionally, the HC trap may warm-up inefficiently due to thermal losses in the exhaust pipe. As another example, as the HC trap temperature increases, the HC trap may release 50% or more of the trapped HCs before the catalyst system reaches the light-off temperature. This issue is further exacerbated as the HC trap releases HCs at a lower temperature and the catalyst lights-off at higher temperatures over continued use during a life of the HC trap. As such, the HC trap system may not sufficiently reduce emissions during cold-starts.

In one example, the issues described above may be addressed by a method comprising flowing combusted exhaust gas to a particulate filter and hydrocarbon trap in a bypass during a cold start, the particulate filter positioned also inside the a main exhaust passage and the hydrocarbon trap positioned outside the main passage. In this way, the HC trap may decrease emissions during a cold-start by capturing untreated emissions passing through a catalyst upstream of the bypass.

As one example, the main exhaust passage is larger than the bypass, and as such, HC trap a diameter of the hydrocarbon trap is less than a diameter of the main exhaust passage. The hydrocarbon trap is located in a portion of the bypass passage spaced away from the main exhaust passage such that a gap is located between exterior surfaces of the main exhaust passage and the bypass. A diverter valve is located in the main exhaust passage between an inlet and an outlet of the bypass. As such, the diverter valve may be actuated to adjust exhaust gas flow through the inlet of the bypass. When the diverter valve is closed, exhaust gas backpressure increases and exhaust gas is forced to flow from the main exhaust passage to the bypass. As an example, the diverter valve is moved to a more closed position during cold-starts where the catalyst of the main exhaust passage is not lit-off. In this way, cold-start emissions flowing through the inactive catalyst may be captured and treated by the hydrocarbon trap in the bypass. By placing the hydrocarbon trap in the bypass, exhaust gas flow to the bypass may decrease following activation (e.g., light-off) of the catalyst by actuating the diverter valve to a more open position. This may increase a lifespan of the hydrocarbon trap.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1A, 1B, and 1C show a single cylinder engine with a HC trap located in a bypass passage.

DETAILED DESCRIPTION

Figure 1A:
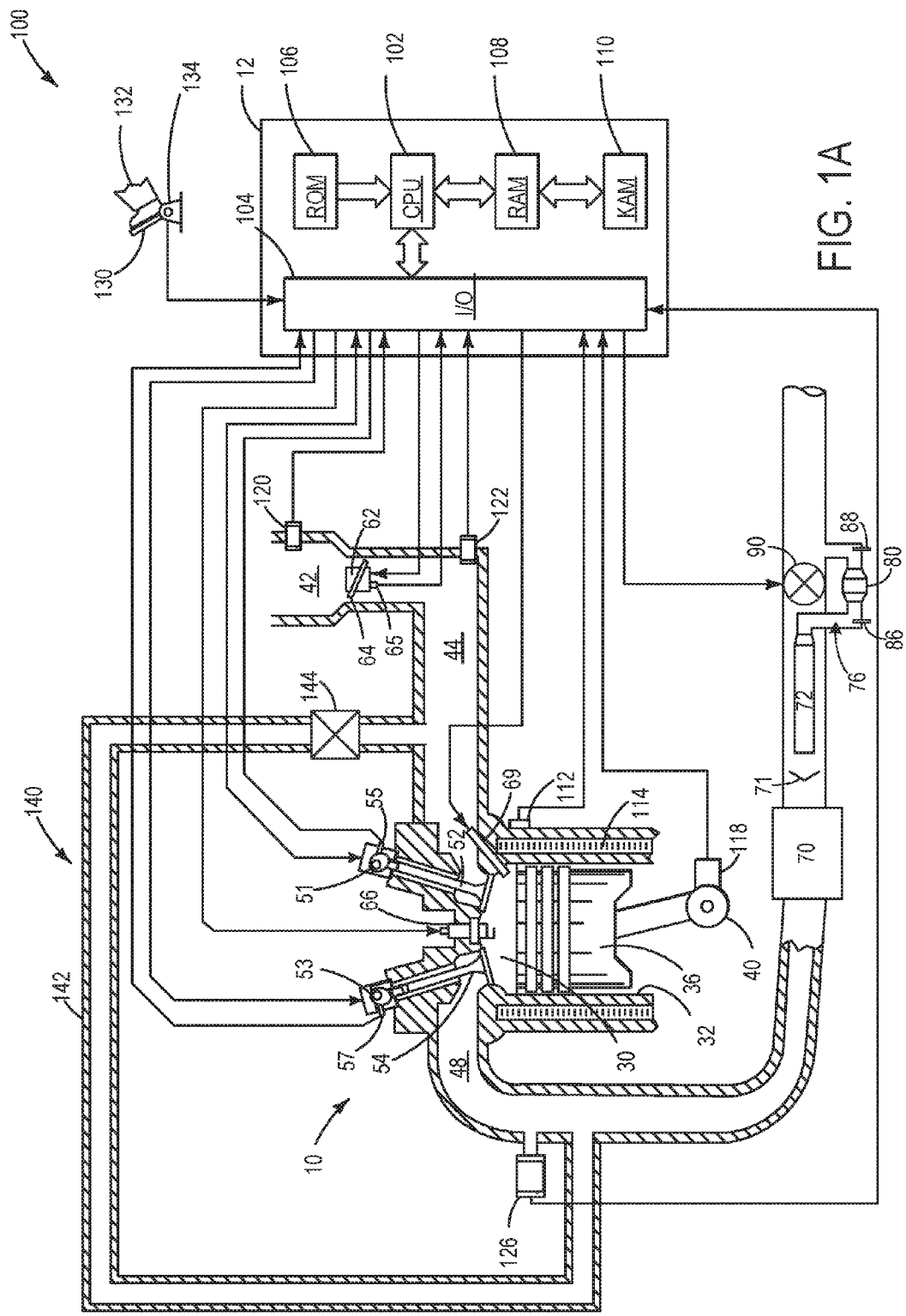
Figure 1B:
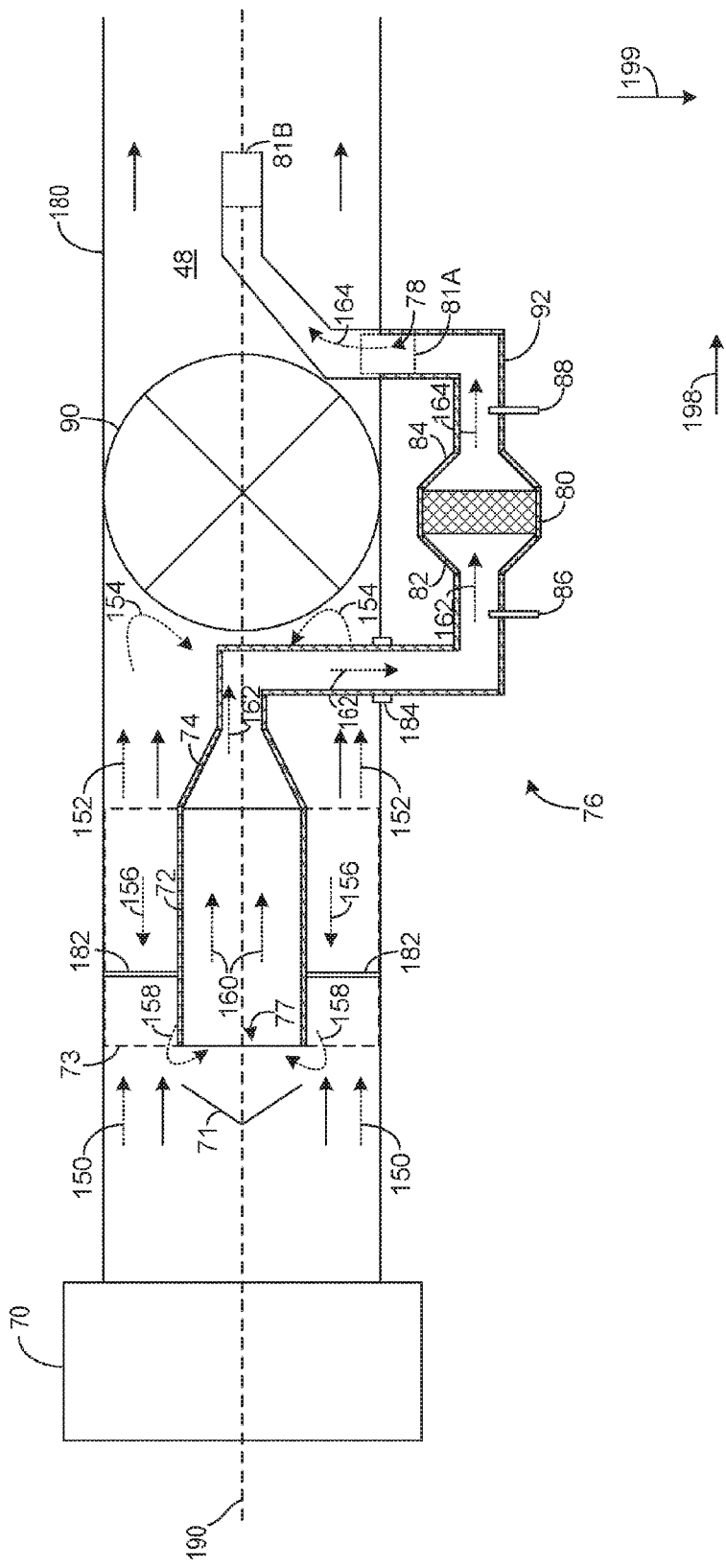
Figure 2A:
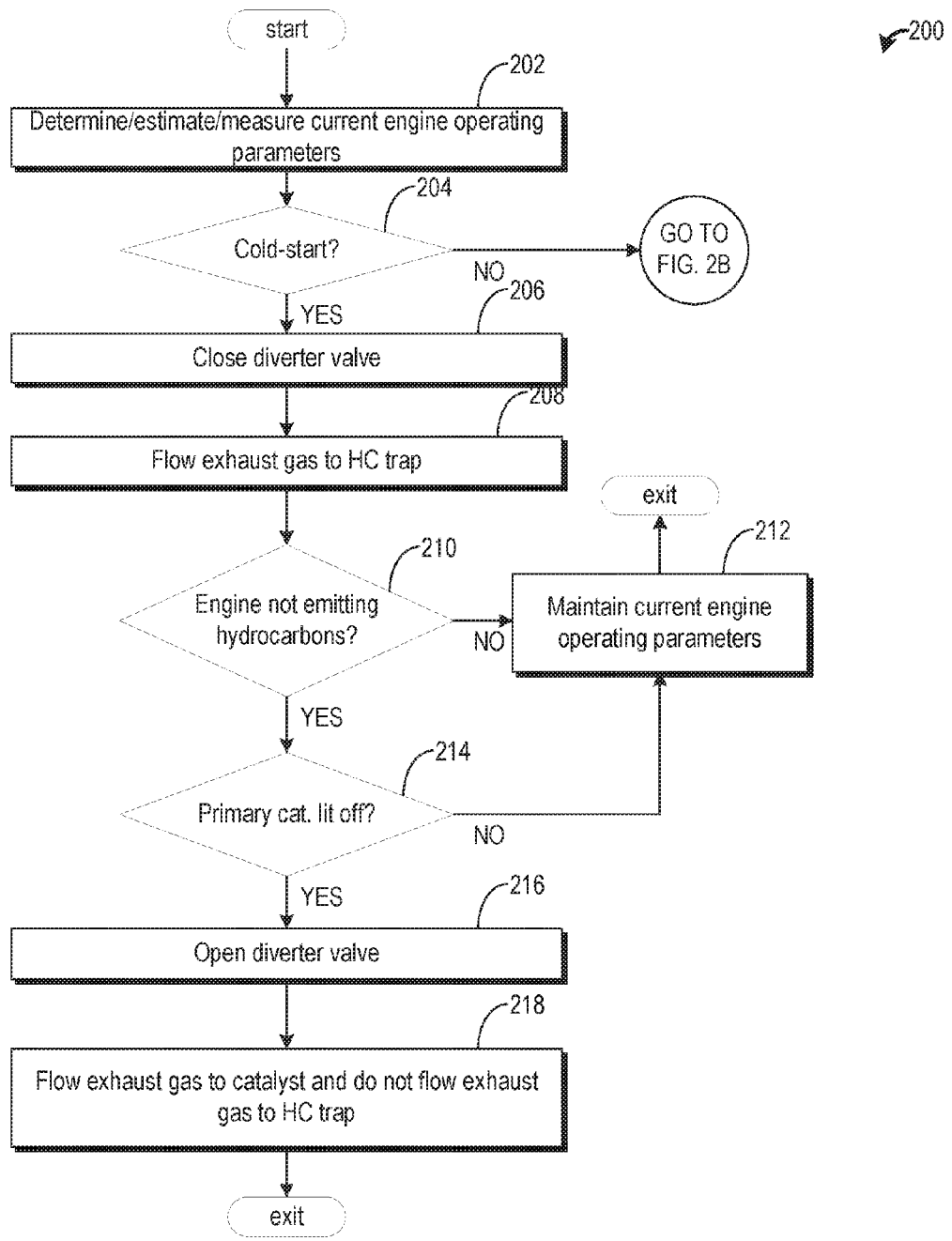
FIGS. 2A, 2B, and 2C show a method for operating a diverter valve to adjust exhaust flow to the bypass passage.
Figure 2B:
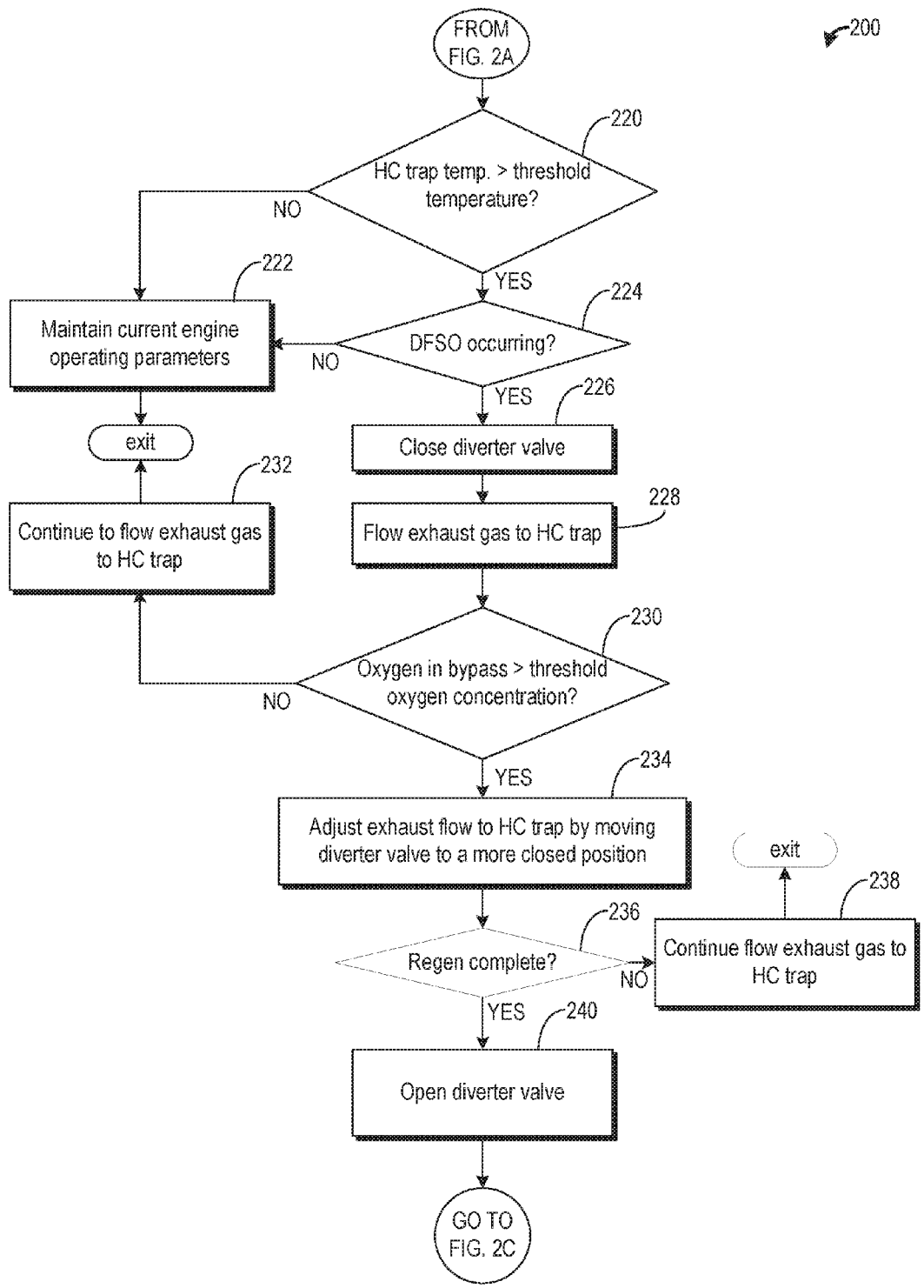
Figure 2C:
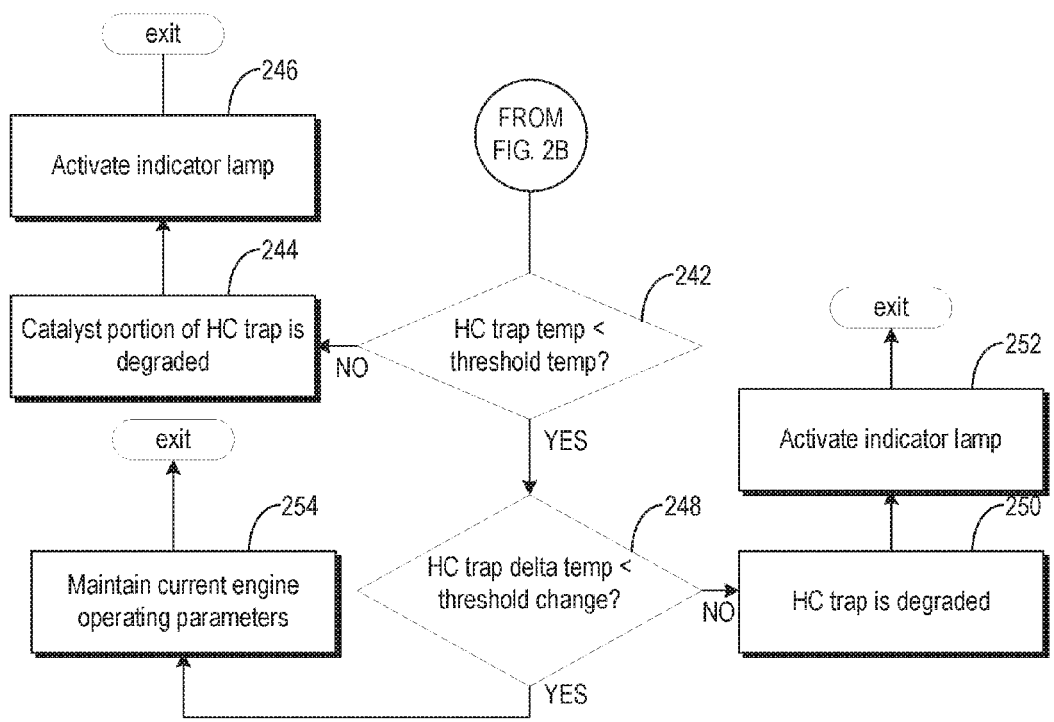
Figure 3:
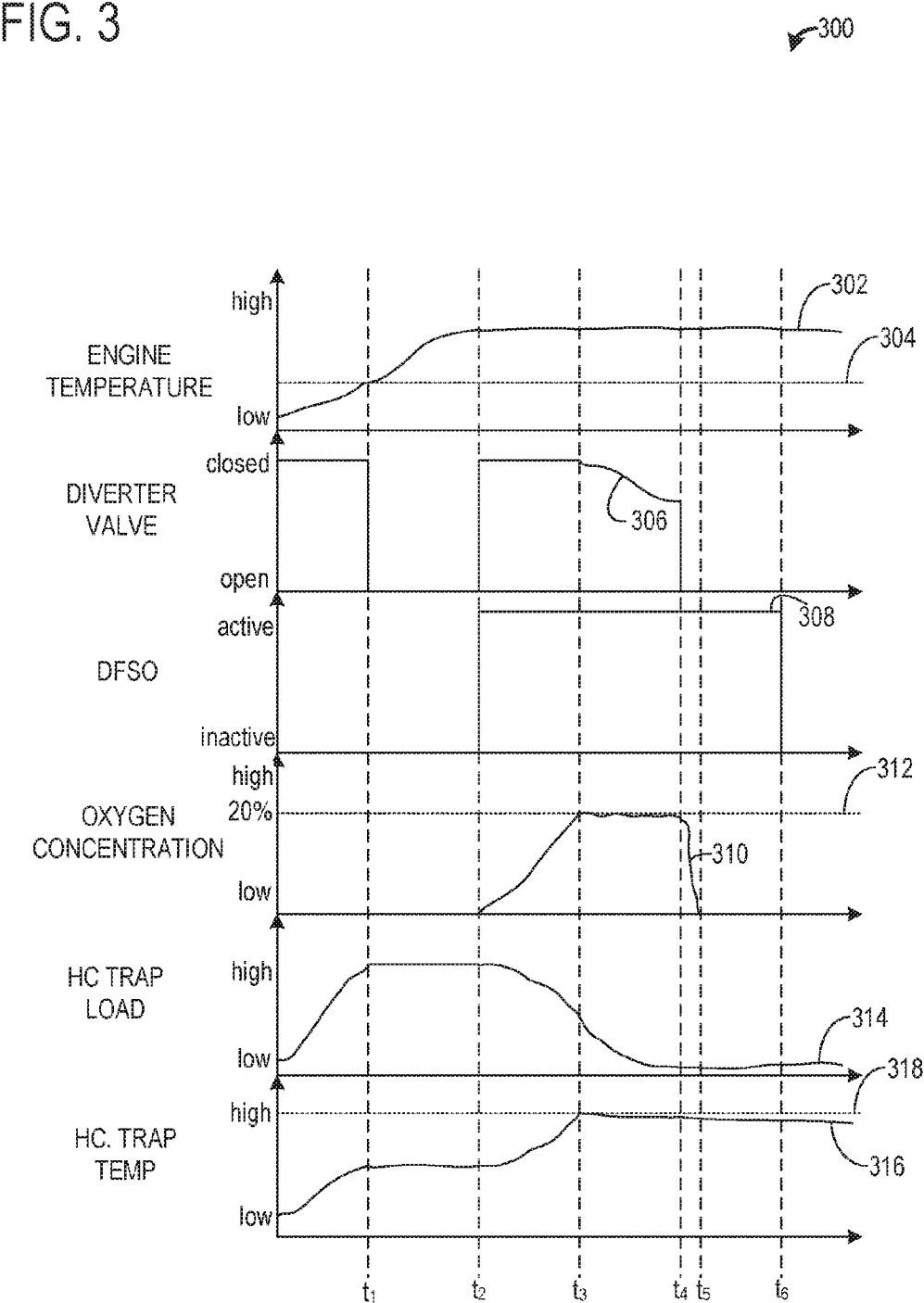
FIG. 3 shows an example operating sequence including a diverter valve and HC trap.

The following description relates to systems and methods for a HC trap in a bypass passage being smaller than a catalyst in a main exhaust passage. A diverter valve located in the main exhaust passage may actuate adjust exhaust gas flow from the main exhaust passage to the bypass passage, as shown in FIGS. 1A, 1B, and 1C. The diverter valve may be actuated in response to an engine temperature and/or a HC trap temperature. Specifically, the diverter valve may move to the fully closed position during a cold-start or DFSO, as shown in FIGS. 2A, 2B, and 2C, which describe a method for operating the diverter valve. During the DFSO, the HC trap may be reset to a less loaded state. During cold-starts, the HC trap may capture cold-start emissions and store the emissions until the catalyst portion of the HC trap is sufficiently heated to oxidize and/or reduce the emissions. The HC trap may warm-up more quickly than the catalyst in the main exhaust passage due to the bypass passage being insulated, in some examples. An engine operating sequence depicting adjustments of the diverter valve based on a variety of conditions is shown in FIG. 3.

FIGS. 1A and 1B show an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" may differ from one another according to manufacturing tolerances (e.g., within 1-5% deviation).

Continuing to FIG. 1A, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), $NO_x$ trap, diesel oxidation catalyst (DOC), various other emission control devices, or combinations thereof. In some examples, during operation of the engine 10, the emission control device 70 may be periodically reset by operating at least one cylinder of the engine within a particular air-fuel ratio.

Turning now to FIG. 1B, it shows a detailed view of the exhaust passage 48 and aftertreatment device 70 shown in FIG. 1A. As such, components previously introduced are similarly numbered. The aftertreatment device 70 may be referred to herein as three-way catalyst (TWC) 70. It will be appreciated that aftertreatment device 70 may not be a TWC, but may be a diesel oxidation catalyst or some other type of catalyst without departing from the scope of the present disclosure. Although not depicted, the exhaust passage 48 may comprise bends, angles, curves, and/or other deviations from linear without departing from the scope of the present disclosure. Longitudinal axis 190 is parallel to the horizontal direction (relative to gravity 199). The longitudinal axis 190 may be a central axis of exhaust pipe 180 and TWC 70.

A particulate filter 72 (solid line) is arranged along the exhaust passage 48 downstream of the TWC 70. The particulate filter 72 may comprise a honeycomb or other perforated structure, allowing engine exhaust gas to flow therethrough. The particulate filter 72 may capture particulates from the engine exhaust gas passing through it, via a PF inlet 77, and store the particulates until a regeneration occurs. As a temperature of the particulate filter 72 increases, the stored particulates become increasingly likely to regenerate (e.g., burn off). Regeneration may reduce a particulate load of the particulate filter 72, thereby allowing it to store a greater amount of particulates compared to a more loaded condition of the particulate filter 72 prior to regeneration. As shown, a diameter of the particulate filter 72 is less than a diameter of the exhaust pipe 180 such that surfaces of the particulate filter 72 are spaced away from the exhaust pipe 180. In this way, exhaust gas flowing adjacent to the exhaust pipe 180 may not flow through the particulate filter 72. Flow diverter 71, located upstream of the particulate filter 72 and downstream of the TWC 70, may redirect exhaust flow along the longitudinal axis 190 to flow adjacent to the exhaust pipe 180 and away from the PF inlet 77. As such, exhaust flow along the longitudinal axis 190 flows through the particulate filter 72 and exhaust gas adjacent the exhaust pipe 180 does not.

In one example, the filter 72 is spaced away, internally and wholly within, the main exhaust passage 48 internal walls to create a space around the outer walls of the filter and the inner walls of the main passage. The bypass passage is rigidly mounted to the filter and anchors the filter so that it can be suspended in the main exhaust passage, and may be further anchored via one or more stand-offs (182). The reduction in conductive heat transfer to the main passage 48 enables regeneration of the filter 72.

An embodiment (dashed lines) of an optional particulate filter 73 is depicted. The optional particulate filter 73 may be substantially similar to the particulate filter 72, except that the optional particulate filter 73 is larger. As shown, the optional particulate filter 73 comprises a diameter substantially equal to a diameter of the exhaust pipe 180. As such, outer surfaces of the optional particulate filter 73 are pressed against inner surfaces of the exhaust pipe 180. In this way, substantially all exhaust gas flowing through the exhaust passage 48 flows through the optional particulate filter 73, regardless of the exhaust flow being adjacent the exhaust pipe or the longitudinal axis 190. As such, the flow diverter 71 does not substantially prevent exhaust gas from flowing through the optional particulate filter 73, as it does with particulate filter 72. It will be appreciated that either the particulate filter 72 or the optional particulate filter 73 may be used without departing from the scope of the present disclosure.

A bypass passage 76 comprises a conical inlet 74 coupled to an entire outlet of the particulate filter 72 or to a portion of an outlet of the optional particulate filter 73. As such, exhaust gas exiting the particulate filter 72 may flow into the bypass passage 76. However, it will be appreciated that a portion of exhaust gas exiting the particulate filter 72 may flow obliquely to the longitudinal axis 190 and not enter the bypass passage 76. Thus, not all exhaust gas exiting the particulate filter 72 enters the bypass passage 76. Alternatively, a portion of exhaust gas exiting the optional particulate filter 73 enters the bypass passage 76. Therefore, substantially all exhaust gas entering the bypass passage 76 has flowed through a particulate filter (e.g., particulate filter 72 or optional particulate filter 73). In one example, only exhaust gas flowing along the longitudinal axis 190 in the optional particulate filter 73 flows through the conical inlet 74 and enters the bypass passage 76. It will be appreciated that flow diverter 71 may redirect a majority of exhaust gas in the exhaust passage 48 away from the longitudinal axis 190 toward the exhaust pipe 180. This may reduce an amount of exhaust gas spontaneously entering the bypass passage 76 without instructions from controller 12 and/or adjustment of a diverter valve 90, as will be described below.

FIG. 1C shows a different orientation of the particulate filter 72. As shown, the PF inlet 77 of the particulate filter 72 faces a direction parallel to arrow 198 in the embodiment of FIG. 1C. As such, exhaust gas may not readily flow into the particulate filter 72 and the flow diverter 71 may be omitted. However, as shown in FIG. 1B, the PF inlet 77 faces a direction opposite arrow 198. Hence, the flow diverter 71 is included in the embodiment of FIG. 1B.

During operating conditions where exhaust backpressure is increased (e.g., when a diverter valve 90 is in a more closed position), the exhaust flow may flow in a direction opposite the arrow 198 and enter the particulate filter 72, thereby flowing into a bypass passage 76. By reversing the orientation of the particulate filter 72 in the embodiment of FIG. 1C compared to FIG. 1B, an overall package of the bypass passage 76 may be decreased and the particulate filter 72 may be more protected from debris in exhaust flow in the embodiment of FIG. 1C compared to FIG. 1B.

Thus, when the diverter valve 90 is actuated to a more closed position, exhaust gas flow may be substantially prevented from flowing therethrough. The exhaust gas may reverse and flow in a direction opposite to the arrow 198, thereby increasing an exhaust backpressure and allowing a portion of exhaust gas flow to enter the particulate filter 72. This allows exhaust gas to flow through the bypass passage 76, outside of the main exhaust passage 48, and avoid the closed diverter valve 90 before returning to the main exhaust passage 48.

In some examples, additionally or alternatively, the particulate filter 72 is located in the bypass passage 76. Thus, all exhaust gas flowing through the particulate filter 72 enters the bypass passage 76.

The bypass passage 76 may be a secondary and/or auxiliary passage originating at the particulate filter 72 or optional particulate filter 73 before extending outside of the exhaust passage 48. The bypass passage 76 is fluidly coupled to the exhaust passage 48 only via the inlet cone 74 and outlet 78. The bypass passage 76 is smaller than the exhaust passage 48 such that a diameter of the bypass passage 76 is smaller than a diameter of the exhaust passage 48. The bypass passage 76 comprises a diameter substantially equal to a smallest diameter of the inlet cone 74. Upstream of a diverter valve 90, the bypass passage 76 turns away from the inlet cone 74, in a direction oblique or perpendicular to the longitudinal axis 190, before extending through the exhaust pipe 180 outside of the exhaust passage 48. The bypass passage 76 is shown physically coupled to the exhaust pipe 180 via one or more bosses 184. This may rigidly couple the bypass passage 76 to the exhaust pipe 180 to prevent rattling and/or other movements due to exhaust flow and/or vehicle movement. Once outside of the exhaust passage 48 and spaced away from the exhaust pipe 180, the bypass passage 76 turns in a direction parallel to the longitudinal axis 190 such that a portion of the bypass passage 76 outside of the exhaust passage 48 is substantially parallel to and spaced away from the exhaust pipe 180. The bypass passage 76 turns back toward the exhaust pipe 180 at a location downstream of the diverter valve, where the bypass passage 76 contacts the exhaust pipe 180. In this way, the portion of the bypass passage 76 outside of the exhaust passage 48 is substantially U-shaped, in one example. It will be appreciated that the bypass passage 76 may be other shapes (e.g., C-shaped, D-shaped, V-shaped, etc.) without departing from the scope of the present disclosure. Furthermore, the portion of the bypass passage 76 inside the exhaust passage 48 is substantially L-shaped, in one example, with a top of the "L" contacting a top, left portion of the "U".

The bypass passage 76 further comprises an outlet 78 fluidly coupled to the exhaust passage 48 at an opening in the exhaust pipe 180 downstream of the diverter valve 90. The outlet 78 expels exhaust gas from the bypass passage 76 to a portion of the exhaust passage downstream of the conical inlet 74 in a direction perpendicular to incoming exhaust gas flow (arrow 198). As such, exhaust gas exiting the bypass passage 76 may not re-enter the bypass passage 76. In one example, exhaust gas exiting the bypass passage 76 is swept through the exhaust passage 48, where it flows out of a tailpipe and into an ambient atmosphere. The bypass passage 76 is not directly fluidly coupled to the ambient atmosphere such that exhaust gas in the bypass passage 76 does not flow directly to the ambient atmosphere. Thus, exhaust gas enters the bypass passage 76 only via the conical inlet 74 and exits the bypass passage 76 only via the outlet 78, in one example. In this way, the bypass passage 76 is contiguous and does not comprise any perforations, cracks, or other openings for receiving or expelling exhaust gas besides the conical inlet 74 and outlet 78, respectively.

A HC trap 80 is located in a portion of the bypass passage 76 spaced away from, outside of, and parallel to the exhaust pipe 180. Said another way, there is a gap between exterior surfaces of the exhaust pipe 180 and exterior surfaces of the bypass passage 76 corresponding with the HC trap 80. The HC trap 80 may be configured to trap HCs at low temperatures (e.g., temperatures substantially equal to ambient). Additionally or alternatively, the HC trap may comprise a catalyst portion configured to oxidize HCs. As such, the HC trap 80 may comprise a catalyst substrate coated with HC trap materials (e.g., zeolites) and the HC trap materials being coated with catalyst materials. Due to the flow diverter 71 decreasing exhaust mass flow through the bypass passage 76 compared to exhaust flow through the TWC 70, the HC trap 80 may be composed of more sensitive transition and/or precious metals (e.g., Pt compared to Pd) compared to the TWC 70. Additionally, the HC trap 80 may comprise a smaller amount of precious metals compared to the TWC 70. The HC trap 80 may be less than 2 cm in diameter and less than 1.5 cm in length, and where the HC trap comprises a Pt wash coat on top of a zeolite surface. For example, the HC trap 80 may comprise Pt and Pd species while the TWC 70 may comprise only Pd species and not Pt species. Pt and Pd may be efficient at oxidizing different HCs. For example, Pt may react with alkanes more efficiently than Pd, while Pd may react with aromatics more efficiently than Pt. As such, a blend and/or a mixture of Pd and Pt species may decrease emissions more than a catalyst having only Pd or only Pt. In this way, the catalyst portion of the HC trap 80 may be optimized to treat HCs. In some examples, the catalyst portion may comprise Pd on carbon, wherein the carbon is activated (comprises a reduced pore size) and increases a surface area exposed to gases. In one example, the HC trap 80 comprises a 0.7 in. (1.8 cm) diameter and a 0.5 in. (1.27 cm) thickness. Flow rate through the HC trap 80 may be up to four liters per minute. In some examples, the Pt and the Pd are preconditioned such that the Pt coat is lean and the Pd coat is rich. This may increase reactivity between the catalyst and the HCs.

In one example, a 1:1 ratio of Pd/Pt is used for the catalytic portion of the HC trap 80. This may result in an optimized alloy capable of treating hydrocarbons during lean, rich, and stoichiometric operations. As an example, the Pd may stabilize the Pt during lean exposure and the Pt may stabilize the Pd during rich exposure. It will be appreciated that other ratios of Pd/Pt may be used. For example, a 2:1, or greater, ratio of Pd/Pt may be used. Alternatively, a 1:2, or greater, ratio of Pd/Pt may be used. In some examples, the ratio may be based on vehicle operations, such that more Pd may be included if the vehicle tends to operate lean more often than rich. Thus, more Pt may be included if the vehicle tends to operate rich more often than lean. Additionally or alternatively, the Pd and Pt layers may be separated in the catalytic portion of the HC trap 80. This may include different catalyst brick zones and/or different layers of washcoat (e.g., washcoat on one side is Pd and washcoat on a second, different side is Pt). In this way, a first metal (e.g., Pt) may oxidize hydrocarbons (e.g., toluene, benzene, xylene, etc.) before the hydrocarbons would degrade the performance of a second metal (e.g., Pd).

As shown, a diameter of the HC trap 80 is greater than a diameter of the bypass passage 76. An inlet cone 82 is located upstream of the HC trap 80, where the inlet cone 82 increases in diameter in the downstream direction, with a most upstream diameter being substantially equal to the diameter of the bypass passage 76 and a most downstream diameter being substantially equal to the diameter of the HC trap 80. Additionally, an outlet cone 84 is located downstream of the HC trap 80. The outlet cone 84 decreases in diameter in the downstream direction, where a most upstream diameter is substantially equal to the diameter of the HC trap 80 and a most downstream diameter is substantially equal to the diameter of the bypass passage 76.

Despite the HC trap 80 being greater in diameter than the bypass passage 76, a HC trap diameter is less than an exhaust passage diameter. As such the HC trap 80 may be smaller than the TWC 70 and the PF 72 (and therefore optional PF 73). In some examples, a PF diameter is substantially equal to the HC trap diameter. In this way, manufacturing costs of the HC trap 80 may be less than those of the TWC 70, while the HC trap 80 may reach light-off temperatures more quickly than the TWC 70 due to its smaller size. Additionally, the bypass passage 76 may be thermally insulated from the exhaust passage 48. In this way, walls of the bypass passage 76 may be double-walled with vacuum between the two walls. This may retain exhaust heat, further allowing the HC trap 80 to more rapidly reach light-off temperatures. It will be appreciated that the insulation may be comprised of other insulating materials without departing from the scope of the present disclosure. As such, the HC trap 80 is a mini-treatment device outside of the exhaust passage 48 in the bypass passage 76.

In this way, the HC trap 80 is configured to capture HCs in the exhaust gas flow, and retain the HCs until a catalyst portion of the HC trap 80 is active (e.g., reaches light-off temperature). By doing this, the catalyst portion may oxidize the HCs before the HCs are released by the HC trap 80.

In one example, the catalyst portion may further comprise one or more NO trapping elements configured to capture NO expelled from the engine during a cold-start. Thus, NO and HCs may be stored on portions of the HC trap 80. Thus, the catalyst portion may comprise elements for treating HCs and $NO_x$. In one example, the catalyst portion comprises a three-way catalyst and a selective reduction catalyst.

The bypass passage 76 further comprises first and second temperature sensors 86 and 88, respectively. The first temperature sensor 86 is located upstream of the inlet cone 82 in a portion of the bypass passage 76 outside of and spaced away from the exhaust passage 48. The second temperature sensor 88 is located downstream of the outlet cone 84 in a portion of the bypass passage 76 outside of the exhaust passage 48. The first temperature sensor 86 may measure a temperature of exhaust gas entering the HC trap 80. The second temperature sensor 88 may measure a temperature of exhaust gas exiting the HC trap 80, headed toward the exhaust passage 48. The first 86 and second 88 temperature sensors may send the measured temperatures to the controller 12 for diagnosing the HC trap 80, as will be described below. In some embodiments, the bypass passage 76 may further comprise an oxygen sensor, HC sensor, and/or particulate sensor.

The bypass passage 76 may further comprise an optional catalyst 81A (shown by a dashed box) located proximal to the outlet 78. All exhaust gas flowing out of the secondary passage 76 flows through the optional catalyst 81A before entering the exhaust passage 48, in one example. The catalyst 81A protrudes into the portion of the exhaust passage 48 located directly downstream of the diverter valve 90. As such, the catalyst 81A may be in contact with exhaust gas during conditions when the diverter valve 90 is open and exhaust gas is not flowing to the second passage 76. In this way, exhaust gas flowing through the exhaust passage 48, and not the bypass passage 76, may contact the catalyst 81A without flowing through the catalyst 81A and/or bypass passage 76. This allows the catalyst 81A to be continually heated during engine combustion vehicle operating conditions.

As shown, the catalyst 81A is partially located outside the exhaust passage 48 in the secondary passage 76 and partially located inside the exhaust passage 48 downstream of the diverter valve 90. In this way, the portion of the catalyst 81A in the exhaust passage 48 may receive exhaust during all fueling conditions of the engine. In some examples, catalyst 81B may be used, which may be located inside the exhaust passage 48 where its inlet is fluidly coupled to outlet 78 of the secondary passage 76. As such, the catalyst 81B only treats HCs released from the HC trap 80 in the secondary passage 76, despite an entirety of the catalyst 81B being located along the exhaust passage 48. In this way, pipes, tubes, etc. of the secondary passage 76 also extend into the exhaust passage 48 downstream of the diverter valve 90. Thus, the catalyst 81B is housed by the secondary passage 76 in the exhaust passage 48, in one example. In some examples, portions of the secondary passage 76 located inside the exhaust passage 48 may not be insulated such that exhaust gas in the exhaust passage 48 may heat these portions. Said another way, only portions of the secondary passage 76 located outside of the exhaust passage 48 are insulated. In this way, a bypass (e.g., secondary passage 76) may include an optional catalyst at its outlet, either partially inside the exhaust passage 48 or completely inside the exhaust passage 48.

As such, the catalysts 81A and/or 81B may be thermally coupled to the exhaust passage 48. However, as will be described below, the secondary passage 76 may be insulated such that components located completely within the secondary passage 76 do not thermally communicate with exhaust gas in the exhaust passage 48. Therefore, a temperature of the catalysts 81A and/or 81B may be substantially different than a temperature of components in the secondary passage 76 (e.g., the HC trap 80).

As an example, the catalysts 81A and/or 81B may be substantially similar to the catalyst portion of the HC trap 80. Thus, the catalysts 81A and/or 81B and catalyst portion of the HC trap 80 may comprise a similar ratio of Pd to Pt. Alternatively, the catalysts 81A and/or 81B may comprise a different composition than the catalyst portion of the HC trap 80. For example, the catalysts 81A and/or 81B may comprise fewer precious metals. As another example, the catalysts 81A and/or 81B may comprise derivatives of aluminum, palladium, chromium, etc. Thus, the catalysts 81A and/or 81B is optimized to treat hydrocarbons released from the HC trap 80.

The diverter valve 90 is located in the exhaust passage 48 between the inlet cone 74 and the outlet 78. The diverter valve 90 is configured to adjust exhaust flow through the exhaust passage 48. When the diverter valve 90 is fully open, exhaust gas in the exhaust passage 48 may flow directly through the diverter valve 90 and may not enter the bypass passage 76 (as shown by solid line arrows). In some examples, when the diverter valve 90 is fully open, a smaller amount of exhaust gas may flow from the exhaust passage 48 to the bypass passage 76, while a larger amount of exhaust gas may remain in the exhaust passage 48. A larger amount of exhaust gas may remain in the exhaust passage 48 due to the flow diverter 71 directing exhaust gas away from the bypass passage 76. By doing this, the HC trap 80 may be exposed to little or no exhaust gas when the diverter valve 90 is fully open, thereby increasing its longevity.

When the diverter valve is in a fully closed position, exhaust gas may not flow through the diverter valve 90 (as shown by dashed line arrows). In this way, an exhaust backpressure is increased, and exhaust gas in the exhaust passage 48 is forced to flow through the particulate filter 72 or optional particulate filter 73, through the inlet cone 74, into the bypass passage 76, through the HC trap 80, through the outlet 78, and into the exhaust passage 48 downstream of the diverter valve 90. Thus, the bypass passage 76 allows exhaust gas in the exhaust passage 48 to bypass the diverter valve 90. Furthermore, all exhaust gas flowing into the bypass passage 76 has flowed through the particulate filter 72 or optional particulate filter 73, in one example.

Specifically, dashed arrows 150 flow adjacent to the exhaust pipe 180 and pass the flow diverter 71. Dashed arrows 152 flow toward the fully closed diverter valve 90, where dashed arrows 154 are unable to flow through the diverter valve 90 and flow in a direction opposite incoming exhaust gas flow 198. This may build up a backpressure to a backpressure great enough to re-flow exhaust gas through the TWC 70. Therefore, the TWC 70 may reach light-off temperatures faster when the diverter valve 90 is in a more closed position compared to a more open position. The more closed position may allow less exhaust gas to flow directly through the exhaust passage 48 compared to the more open position. Dashed arrows 156 continue to flow in a direction opposite incoming exhaust gas flow, where the arrows turn (dashed arrows 158) and flow through the PF 72 or the optional PF 73. Exhaust gas in the PF 72 or optional PF 73 flows adjacent to the longitudinal axis 190 (dashed arrows 160) and enters the bypass passage 76 (dashed arrows 162) via the inlet cone 74. Dashed arrows 162 continue to flow through the bypass passage 76 before passing through the HC trap 80 in the portion of the bypass passage 76 spaced away from the exhaust pipe 180 (e.g., the portion with a gap between exterior surfaces of the exhaust pipe 180 and a pipe of the bypass passage 76). Exhaust gas downstream of the HC trap 80 (dashed arrows 164) continues to flow through the bypass passage 76 before flowing through the outlet 78 and turning into the exhaust passage 48 at a location downstream of the diverter valve. Thus, exhaust gas flowing out of the bypass passage 76 does not flow through and/or contact the diverter valve 90, in one example.

The diverter valve 90 is adjusted based on signals from the controller 12 in response to engine conditions. As one example, the controller 12 may signal to an actuator of the diverter valve 90 to adjust the diverter valve 90 to a fully closed position in response to an engine cold-start occurring. By adjusting the diverter valve 90 to the fully closed position, engine exhaust gas is diverted to the bypass passage 76. Additionally, the controller 12 may signal to adjust the diverter valve 90 to the fully closed position in response to a decelerated fuel shut-off (DFSO) event occurring, in some examples. Alternatively, the controller 12 may signal to adjust the diverter valve 90 to the fully open position in response to a cold-start being terminated and/or a DFSO not occurring. Additionally or alternatively, the controller 12 may adjust the diverter valve 90 to positions between the fully open and fully closed positions. As an example, a more closed position (e.g., a position closer to the fully closed position compared to the fully open position) may divert a greater amount of exhaust gas from the exhaust passage 48 to the bypass passage 76 than a more open position (e.g., a position closer to the fully open position compared to the fully closed position). As such, the more open position diverts less exhaust gas to the bypass passage 76 from the exhaust passage 48. The controller 12 receives signals from the various sensors of FIGS. 1A and 1B and employs the various actuators of FIGS. 1A and 1B to adjust engine operation based on the received signals and instructions stored on a memory of the controller. In one example, the controller 12 may adjust a position of the diverter valve 90 based on information received from one or more of the first 86 and second 88 temperature sensors. Adjusting the diverter valve 90 in response to engine conditions will be described in greater detail below with respect to FIGS. 2A, 2B, and 2C.

Returning to FIG. 1A, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

In one example, the EGR system 140 may be a high pressure (HP) EGR system. As such, a turbine may be located downstream of the EGR passage 142 in the exhaust passage 48. The turbine may be mechanically coupled to a compressor located upstream of the intake manifold 44, such that the compressor may provide charged air to the intake manifold 44 as exhaust gas flows through the turbine. In other examples, the EGR system 140 may be a low pressure (LP) EGR system. As such, the turbine may be located upstream of the EGR passage 142 in the exhaust passage 48.

The controller 12 is shown as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

As described above, FIG. 1A shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12 to be carried out by the controller in combination with the engine hardware, as illustrated in FIG. 1A.

Thus, FIGS. 1A and 1B show a system comprising a main exhaust passage having a catalyst, a bypass passage fluidly coupled to an outlet of a particulate filter in the main exhaust passage downstream of the catalyst, the bypass passage comprising a HC trap smaller than the catalyst, and a diverter valve located in the main exhaust passage between an inlet and an outlet of the bypass passage. A controller with computer-readable instructions for adjusting a position of the diverter valve based on a catalyst temperature or a HC trap temperature. The main exhaust passage further comprises a flow diverter located upstream of the particulate filter, and where the flow diverter directs exhaust gas away from an inlet of the bypass passage. The HC trap is located in a portion of the bypass passage located outside of and spaced away from an exhaust pipe of the main exhaust passage. The bypass passage is double walled with vacuum located between inner and outer walls. The bypass passage is thermally insulated from the main exhaust passage, as shown by insulation 92. The insulation 92 does not surround an entirety of the optional catalysts 81A and/or 81B. Specifically, the insulation 92 does not cover a portion of the optional catalysts 81A and/or 81B in the exhaust passage 48. The insulation 92 does not cover an inlet of the particulate filter 72 or an outlet of the optional catalysts 81A and/or 81B. In some examples, the insulation 92 may cover the portion of the optional catalysts 81A and/or 81B in the exhaust passage 48. The HC trap is less than 2 cm in diameter and less than 1.5 cm in length, and where the HC trap comprises a Pt wash coat on top of a zeolite surface. A catalyst portion of the HC trap is different in composition than the catalyst in the main exhaust passage.

Additionally or alternatively, the system may comprise a particulate filter arranged in front of a bypass within a main exhaust passage of an exhaust system, a hydrocarbon trap arranged in a bypass passage outside the main exhaust path, and a single diverter valve positioned downstream of the particulate filter in the main exhaust path, the single diverter valve configured to control exhaust flow through both the particulate filter and the hydrocarbon trap. A controller with computer-readable instructions for adjusting a position of the diverter valve in response to an engine temperature being less than a threshold engine temperature or a decelerated fuel shut-off event occurring. The main exhaust passage further comprises a flow diverter located upstream of the particulate filter, and where the flow diverter is concave relative to the particulate filter. The bypass comprises an L-shaped portion located in the main exhaust passage and a U-shaped portion located outside the main exhaust passage. The bypass is thermally insulated from the main exhaust passage and an ambient atmosphere. The bypass comprises a bypass diameter, the bypass diameter being less than a main exhaust passage diameter, and where a diameter of the hydrocarbon trap is less than the main exhaust passage diameter. The hydrocarbon trap further comprises a catalyst portion configured to treat trapped hydrocarbons prior to the hydrocarbon trap releasing the trapped hydrocarbons. The bypass comprises a bypass inlet abutted to an outlet of the particulate filter upstream of the diverter valve, and the bypass further comprising a bypass outlet extending through a surface of the main exhaust passage at a location downstream of the diverter valve.

In an alternate embodiment, a method comprising trapping emissions in a HC trap when an engine temperature is less than a threshold engine temperature, retaining the emissions when a HC trap temperature is less than a threshold temperature, and treating the emissions when the HC trap temperature exceeds the threshold temperature. The HC trap is located in a bypass passage and/or auxiliary passage located outside of a primary exhaust passage configured to receive engine exhaust gas. The HC trap is a small treatment device, smaller than a catalyst in the primary exhaust passage. A catalyst temperature of the catalyst is less than a threshold catalyst temperature and unreactive when the engine temperature is less than the threshold engine temperature. The method further comprises flowing engine exhaust gas to the bypass passage when a catalyst temperature is less than the threshold catalyst temperature by moving a diverter valve to a more closed position. The diverter valve is moved to a more open position in response to the catalyst temperature exceeding the threshold catalyst temperature. The bypass passage is thermally isolated from the main exhaust passage and an ambient atmosphere, and where the bypass passage comprise insulating elements. In one example, the insulating element is a vacuum element. Additionally or alternatively, the diverter valve is moved to a more closed position in response to a DFSO event occurring, where an oxygen concentration near the HC trap is increased.

Turning now to FIGS. 2A, 2B, and 2C, they show an exemplary method 200 for operating a diverter valve configured to bypass exhaust gas from a main exhaust passage (e.g., exhaust passage 48 of FIGS. 1A and 1B) to an auxiliary passage (e.g., bypass passage 76 of FIGS. 1A and 1B) comprising a HC trap (e.g., HC trap 80 of FIGS. 1A and 1B). Instructions for carrying out method 200 may be executed by a controller (e.g., controller 12 of FIG. 1A) based on instructions stored on a memory of the controller and in conjunction with signals received from sensors of the engine system, such as the sensors described above with reference to FIGS. 1A and 1B. The controller may employ engine actuators of the engine system to adjust engine operation, according to the methods described below.

Method 200 may begin at 202, where the method 200 determines, estimates, and/or measures current engine operating parameters. Current engine operating parameters may include but are not limited to one or more of engine temperature, coolant temperature, engine load, vehicle speed, oxygen concentration in exhaust flow, and air/fuel ratio.

At 204, the method 200 determines if a cold-start is occurring. A cold-start may be determined based on an engine temperature being less than a threshold engine temperature. The engine temperature may be determined via an engine temperature sensor, an engine coolant temperature, and/or an ambient temperature sensor. The threshold engine temperature may be based on a desired engine operating temperature range (e.g., 180-200° F.). If the determined engine temperature is less than the threshold engine temperature, then the method 200 proceeds to 206 to close the diverter valve. A catalyst (e.g., TWC 70 shown in FIGS. 1A and 1B) in the main exhaust passage and/or primary exhaust passage (e.g., exhaust passage 48 of FIGS. 1A and 1B) may not be lit-off during a cold-start, and thus, unable to treat hydrocarbons formed during the cold-start. By closing the diverter valve, backpressure in the exhaust passage is increased by preventing engine exhaust gas to flow directly through the main exhaust passage without flowing through the bypass passage. This not only forces exhaust gas to flow through the particulate filter and into the bypass passage having the HC trap to treat the hydrocarbons formed during the cold-start, but it also allows the catalyst to heat up more rapidly due to the backpressure. Thus, the backpressure may promote exhaust gas to recirculate through the catalyst in the main exhaust passage.

At 208, the method 200 includes flowing exhaust gas from the main exhaust passage to the bypass passage. The exhaust gas flows through the HC trap, where the hydrocarbons, formed during the cold-start that have passed through the inactive catalyst, are trapped onto surfaces of the HC trap. The hydrocarbons may not react with the catalyst portion of HC trap due to the catalyst not being lit-off. However, the hydrocarbons may be trapped and are retained on the HC trap portion of the HC trap until the catalyst portion is lit-off, where the hydrocarbons are then oxidized and released from the HC trap and directed back to the main exhaust passage.

At 210, the method 200 determines if the engine is no longer emitting hydrocarbons via a HC sensor located in the main exhaust passage. Alternatively, hydrocarbons may no longer be emitted from the engine if an in-cylinder temperature is substantially equal to the threshold engine temperature described above. If the engine is still emitting hydrocarbons, then the method 200 proceeds to 212 to maintain current engine operating parameters and keeps the diverter valve closed. In this way, hydrocarbons continue to be trapped in the bypass passage via the HC trap and catalyst.

If the engine is no longer emitting hydrocarbons, then the method 200 proceeds to 214 to determine if a primary catalyst (e.g., the TWC located in the main exhaust passage) is lit-off. The TWC is lit-off when it reaches a threshold TWC temperature, which is based on an operating temperature of the TWC capable of reacting with HCs. If the primary catalyst is not lit-off, then the method 200 proceeds to 212 and maintains current engine operating parameters and maintains the diverter valve closed, as described above. In this way, exhaust gas continues to flow to the HC trap in the bypass passage, where untreated HCs are captured.

If the TWC is lit-off (e.g., TWC temperature reaches the threshold TWC temperature), then the method 200 proceeds to 216 to open the diverter valve. The controller signals an actuator of the diverter valve to adjust the diverter valve from the fully closed position to a fully open position, in one example.

At 218, the method 200 flows exhaust gas through the TWC and may not flow exhaust gas to the HC trap. By adjusting the diverter valve to the fully open position, the primary exhaust passage is less obstructed compared to the fully closed position. As such, exhaust gas may no longer flow through the bypass passage to the HC trap. In this way, HCs are treated in the TWC in the main exhaust passage without flowing exhaust gas to the HC trap. This may increase a longevity of the HC trap.

Thus, in one embodiment, a method comprises flowing combusted exhaust gas to a particulate filter and hydrocarbon trap in a bypass during a cold start and where the particulate filter is positioned inside the a main exhaust passage and the hydrocarbon trap is positioned outside the main passage. The particulate filter is located upstream of a diverter valve relative to a direction of exhaust gas flow, the diverter valve is configured to adjust exhaust flow to the bypass in response to engine conditions. The bypass comprises an inlet physically coupled to an outlet of the particulate filter and a bypass outlet located downstream of the diverter valve. The HC trap positioned outside the main exhaust passage includes being positioned in a portion of the bypass where an exterior surface of the bypass is outside of and spaced away from an exterior surface of the main exhaust passage. In some examples, actuating a diverter valve to a more closed position to increase exhaust gas flow to the bypass and actuating the diverter valve to a more open position to decrease exhaust gas flow to the bypass. The hydrocarbon trap comprises catalytic elements located thereon.

Returning to 204, if a cold-start is not occurring (e.g., engine temperature is greater than the threshold engine temperature), then the method 200 proceeds to 220 of FIG. 2B. At 220, the method 200 includes determining if the HC trap is greater than a threshold regeneration temperature. In one example, the threshold regeneration temperature is based on a temperature of the HC trap being able to combust when exposed to high oxygen concentrations in exhaust gas flow. For example, oxygen concentrations in exhaust gas flow may be higher during DFSO compared to fueled cylinder events. If the HC trap is less than the threshold regeneration temperature, then the method 200 proceeds to 222 and maintains current engine operating parameters and does not regenerate the HC trap.

If the HC trap temperature is greater than the threshold regeneration temperature, then the method 200 proceeds to 224 to determine if a DFSO is occurring. The DFSO is occurring if the cylinders are not receiving fuel injections. Said another way, DFSO is occurring if engine combustion cycles continue in the absence of fuel injections. In this way, intake air may continue to be admitted to the cylinders, where pistons may still be oscillating, and expelled to the primary exhaust passage. If DFSO is not occurring, then the method 200 proceeds to 222 to maintain current engine operating parameters. The exhaust gas, composed substantially of intake air during DFSO, flows through the primary exhaust passage and may not enter the bypass passage. In this way, regeneration of the combination HC trap and catalyst may not occur, even if it is above the threshold regeneration temperature.

In some embodiments, additionally or alternatively, the method 200 may include determining a temperature of an optional catalyst (e.g., catalysts 81A and/or 81B of FIG. 1B) at 220. As such, if a temperature of the optional catalyst is greater than a threshold optional catalyst temperature, then the method 200 may proceed to 224. Thus, the threshold optional catalyst temperature may be based on a HC trap regeneration temperature. As described above, the optional catalyst is located in both the exhaust passage and the secondary passage (e.g., exhaust passage 48 and secondary passage 76 of FIG. 1B). As such, the temperature of the optional catalyst may be used to estimate and/or calculate the HC trap temperature. In some examples, additionally or alternatively, the method 200 proceeds to 224 only if the HC trap temperature is greater than the threshold regeneration temperature and the optional catalyst temperature is greater than the threshold optional catalyst temperature. In this way, regeneration of the HC trap may be triggered following determination of both temperature being greater than respective thresholds. In other examples, the method 200 proceeds to 224 if at least one of the HC trap temperature or optional catalyst temperature is greater than the threshold regeneration temperature or threshold optional catalyst temperature, respectively.

In some examples, hot exhaust gas may be diverted to the bypass passage to regenerate the combination HC trap and catalyst even when the HC trap temperature is less than the threshold regeneration temperature and/or if a DFSO is not occurring. Exhaust gas temperatures may be sufficiently hot to regenerate the HC trap when an engine load is high, in one example. However, during high engine loads, backpressure may negatively impact engine performance. As such, the diverter valve may be adjusted toward a more closed position from a fully closed position. In this way, backpressure may be sufficient to promote exhaust flow into the bypass passage while not negatively impacting engine performance. This allows the HC trap to regenerate even if the HC trap temperature is less than the threshold regeneration temperature and/or if DFSO is not occurring.

If the DFSO is occurring, then the method 200 proceeds to 226. At 226, the method 200 includes closing the diverter valve. By closing the diverter valve, backpressure in the main exhaust passage increases. However, the backpressure does not adversely impact engine performance due to combustion stability being moot during DFSO.

At 228, the method 200 includes flowing exhaust gas from the main exhaust passage to the bypass passage where the HC trap. The increased oxygen in the exhaust gas from the DFSO may allow HCs trapped on the HC trap to burn off. This may reset the HC trap to a less loaded state where the HC trap is capable of capturing more HCs than a more loaded state.

At 230, the method 200 includes determining if an oxygen concentration in the secondary bypass passage is greater than a threshold oxygen concentration. In one example, the threshold oxygen concentration may be based on a concentration of oxygen capable of degrading the HC trap. Said another way, an oxygen concentration greater than the threshold oxygen concentration may lead to an uncontrolled regeneration where the HC trap temperature get too hot (e.g., greater than a threshold upper temperature), which may lead to holes and/or cracks. This may reduce trapping and/or catalytic capabilities of the HC trap. The oxygen concentration may be determined by an oxygen sensor located in the bypass passage. Additionally or alternatively, the oxygen concentration may be determined via a second temperature sensor in the bypass passage located downstream of the HC trap. A temperature signal from the second temperature may be used to estimate an oxygen concentration at the HC trap. Additionally or alternatively, a mass air flow sensor (e.g., mass air flow sensor 120 shown in FIG. 1A) may be used to estimate an oxygen concentration at the HC trap.

If the oxygen concentration is less than the threshold oxygen concentration, then the method proceeds to 232 to continue to flow exhaust gas to the bypass passage and maintains the diverter valve in the fully closed position. In this way, regeneration of the HC trap may continue.

If the oxygen concentration is greater than the threshold oxygen concentration, then the method 200 proceeds to 234 to adjust the exhaust flow to the bypass passage by adjusting a position of the diverter valve. In one example, the diverter valve may be adjusted to a fully open position from the fully closed position in response to the oxygen concentration be greater than the threshold oxygen concentration. In this way, exhaust flow to the bypass passage is decreased and/or substantially prevented. In some examples, additionally or alternatively, the diverter valve may be adjusted to a position between the fully open and fully closed positions in response to the oxygen concentration be greater than the threshold oxygen concentration. As an example, the diverter valve may be adjusted to a more closed position from the fully closed position, wherein the more closed position allows more exhaust gas to remain in the primary exhaust passage, thereby allowing less exhaust gas (e.g., oxygen) to flow to the bypass passage. This may decrease an oxygen concentration in the bypass passage. In this way, a regeneration temperature of the HC trap may be controlled by adjusting a position of the diverter valve during DFSO.

At 236, the method 200 includes determining if regeneration of the HC trap is complete. The regeneration may be complete when the HC trap is reset to a fully unloaded state (e.g., substantially no hydrocarbons on the HC trap). In some examples, the regeneration may be terminated prior to being complete due to a DFSO being deactivated in response to a tip-in. This may result in a partial regeneration of the HC trap. If the regeneration is not complete then the method 200 proceeds to 238 to continue flowing exhaust gas to the HC trap and does not move the diverter valve to a fully open position.

If the regeneration is complete, then the method 200 proceeds to 240 to adjust the diverter valve to the fully open position where substantially no exhaust gas flows to the bypass passage. As such, exhaust gas flow to the bypass passage is terminated, during the DFSO if regeneration is complete.

At 242 of FIG. 2C, the method 200 includes determining if the HC trap temperature is less than a threshold upper temperature. The threshold upper temperature may be based on a temperature capable of degrading the catalyst portion of the HC trap. If the HC trap temperature is not less than the threshold upper temperature, then the method 200 proceeds to 244. At 244, the method 200 includes determining the catalyst portion of the HC trap is degraded. Temperatures above the threshold upper temperature may degrade (e.g., melt) a substrate of the catalyst, thereby deactivating the catalysts. In one example, if too many unburned or partially burned hydrocarbons are near the catalyst and burn uncontrollably, then the catalyst temperature may surpass the threshold upper temperature, which may result in degradation.

At 246, the method 200 includes activating an indicator lamp to alert a vehicle operator that the HC trap is degraded. The method 200 may further include limiting fueling to decrease emissions during cold-starts. Additionally or alternatively, the method 200 may further include not flowing exhaust gas to the HC trap during DFSO in response to the catalyst portion being degraded.

If the HC trap temperature is less than the threshold upper temperature, then the method 200 proceeds to 248 to determine if the HC trap change in temperature is less than a threshold temperature change. The threshold temperature change may be based on a temperature change capable of degrading the HC trap. If the temperature change is too great, then the HC trap may expand more than desired and develop cracks and/or holes, which may result in HCs leaking through the HC trap. As such, if the HC trap change in temperature is not less than the threshold temperature change, then the method 200 proceeds to 250. In some examples, the HC trap may be degraded if the HC trap temperature exceeds the threshold upper temperature. In this way, the threshold upper temperature may indicate a temperature capable of degrading the HC trap portion of the HC trap, independent of a temperature change.

At 250, the method 200 includes indicating the HC trap portion of the HC trap is degraded by activating an indicator lamp at 252 and/or setting a code stored in non-transitory memory, the code including a unique identifier corresponding to degradation of the HC trap. The method 200 may further include limiting fueling during cold-starts to decrease cold-start emissions in response to the indication. Additionally or alternatively, the method 200 may further include not flowing exhaust gas to the HC trap during DFSO and/or cold-starts responsive to the indication.

If the HC trap change in temperature is less than the threshold temperature change, then the method 200 proceeds to 254 to maintain current engine operating parameters and does not indicate the HC trap being degraded. In this way, the HC trap was regenerated and a regeneration temperature was sufficiently controlled to mitigate degradation to the HC trap during DFSO.

Thus, a method may comprise, during a cold start condition comprising an engine temperature being less than a threshold engine temperature or when engine temperature has cooled to within a threshold of ambient temperature, closing a diverter valve to bypass exhaust gas from a main exhaust passage to a HC trap in a bypass passage, and opening the diverter valve to prevent exhaust gas flow to the HC trap when the engine temperature is greater than or equal to the threshold engine temperature. By closing the diverter valve, the method directs exhaust gas to the bypass passage during a decelerated fuel shut-off event. By opening the diverter valve, the method decreases and/or prevents exhaust gas flow to the bypass passage during the decelerated fuel shut-off event in response to an oxygen concentration in the bypass passage exceeding a threshold oxygen concentration. The method further comprises diagnosing a condition of the HC trap based on feedback from a first temperature sensor and a second temperature sensor located upstream and downstream of the HC trap.

Additionally or alternatively, the method may comprise during DFSO, adjusting a valve controlling bypass flow to a hydrocarbon trap and particulate filter in bypass based on a temperature of the hydrocarbon trap. Adjusting in response to the temperature of the hydrocarbon trap being less than a threshold upper temperature includes actuating the valve to a more closed position to increase an exhaust backpressure in a main exhaust passage, forcing exhaust gas to flow through the particulate filter at a location upstream of the valve in the main exhaust passage, the exhaust gas further flowing through the hydrocarbon trap located outside the main exhaust passage before returning to the main exhaust passage at a location downstream of the valve. However, adjusting in response to the temperature of the hydrocarbon trap being greater than the threshold upper temperature includes actuating the valve to a more open position to decrease exhaust backpressure, and to decrease exhaust gas flow from the main exhaust passage to the bypass having the hydrocarbon trap. A particulate filter diameter and a hydrocarbon trap diameter are less than a main exhaust passage diameter, the valve configured to flow more exhaust gas from the main exhaust passage to the bypass when in a more closed position compared to a more open position. The temperature of the hydrocarbon trap is estimated based on one or more of a first temperature sensor and second temperature sensor, where the first and second temperature sensor are located in a portion of the bypass outside of a main exhaust passage housing the valve.

Turning now to FIG. 3, it shows an operating sequence 300 illustrating example results for a HC trap located in a bypass passage of an engine exhaust system. Line 302 represents an engine temperature and line 304 represents a threshold engine temperature, line 306 represents a diverter valve position, line 308 represents if DFSO is occurring or not, line 310 represents an oxygen concentration in the bypass passage adjacent the HC trap, line 312 represents a threshold oxygen concentration, line 314 represents a HC trap load, line 316 represents a HC trap temperature and line 318 represents a threshold upper temperature. The horizontal axes if each plot represent time and time increases from the left side of the figure to the right side of the figure.

Prior to $t_1$, the engine temperature (line 302) is less than a threshold engine temperature (line 304). The threshold engine temperature may be based on a threshold lower temperature where engine temperatures below the threshold lower temperature correspond to an engine cold-start. As such, a cold-start may be occurring prior to $t_1$. The diverter valve (line 306) is in an open position to allow exhaust gas to flow from the main exhaust passage to the bypass passage where the HC trap is located. In this way, emissions generated during the cold-start may be trapped by the HC trap. Thus, the emissions are not emitted to the ambient atmosphere despite a catalyst in the main exhaust passage not being lit-off (e.g., capable of reacting with the emissions). The HC trap load (line 314) on the HC trap increases. The HC trap temperature (line 316) increases toward the threshold HC trap temperature (line 318). DFSO (line 308) is not occurring and as a result, an oxygen concentration (line 310) is relatively low (e.g., below threshold oxygen concentration (line 312)) or substantially zero.

At $t_1$, the engine temperature reaches the threshold lower temperature, thereby signaling an end of the cold-start. As such, the diverter valve is closed to substantially prevent exhaust gas to flow from the main exhaust passage to the bypass passage. The TWC in the primary exhaust passage may be lit-off following completion of the cold-start. Additionally or alternatively, the engine may be producing less emissions following completion of the cold-start. In this way, the diverter valve is closed to prolong a longevity of the HC trap by not flowing exhaust gas continuously to the HC trap. The HC trap load of the HC trap remains substantially constant since emissions are no longer flowing to the bypass passage. Likewise, the HC trap temperature remains substantially constant since exhaust gas does not flow to the bypass passage when the diverter valve is closed. As described above, the walls of the bypass passage and/or a housing of the HC trap may be insulated. As such, the bypass passage and the HC trap may not thermally communicate with the primary exhaust passage or with exhaust gas in the primary exhaust passage. DFSO is not occurring and as a result, the oxygen concentration is relatively low and/or substantially zero.

After $t_1$ and prior to $t_2$, the engine temperature is still above the threshold lower temperature and continues to increase. As such, the engine load may be increasing. The diverter valve remains closed, thereby keeping the HC trap load and the HC trap temperature substantially constant.

At $t_2$, the engine temperature stagnates at a temperature above the threshold lower temperature. The engine temperature may remain constant when the engine load is substantially constant (e.g., coasting). In some examples, the engine temperature may be substantially constant when a vehicle operator is neither depressing nor inclining an accelerator pedal (e.g., foot is off the gas pedal). In response, DFSO may be initiated, where one or more cylinders of the engine no longer receive fuel and are deactivated. However, the deactivated cylinders may still receive intake air and respective pistons may continue oscillating. In this way, an amount of oxygen in the exhaust gas flow may increase. The diverter valve is opened during DFSO and exhaust gas from the primary exhaust passage flows into the bypass passage. In this way, the oxygen concentration near the HC trap begins to increase. The HC trap temperature also begins to increase as the oxygen and HCs trapped on the HC trap begin to combust. In this way, the HC load on the HC trap begins to decrease.

After $t_2$ and prior to $t_3$, the engine temperature remains substantially constant and the DFSO remains active. The diverter valve remains in the fully closed position and the oxygen concentration continues to increase toward the threshold oxygen concentration. As such, the HC load continues to decrease and the HC trap temperature continues to increase toward the threshold upper temperature.

At $t_3$, the engine temperature remains substantially constant and the DFSO continues. The oxygen concentration increases and becomes substantially equal to the threshold oxygen concentration. As a result, the HC trap temperature increases and becomes substantially equal to the threshold upper temperature. As such, the diverter valve moves from the fully closed position to a less closed position such that less exhaust gas from the main exhaust passage flows to the bypass passage. The regeneration continues, as shown by the HC load on the HC trap decreasing.

After $t_3$ and prior to $t_4$, the engine temperature remains substantially constant and the DFSO continues. The mass oxygen decreases as the diverter valve is moved to a more open position between the fully closed and fully opened positions. The HC trap temperature begins to decrease to a temperature below the threshold upper temperature. However, the HC trap temperature is sufficiently hot to continue to react with oxygen and burn HCs. As such, the HC load on the HC trap continues to decrease.

At $t_4$, the TWC temperature remains substantially constant and the DFSO continues. The HC load on the HC trap is relatively low and/or substantially zero. In this way, the regeneration may be complete and the HC trap may no longer have HCs to burn off. As such, the diverter valve is moved to a fully open position to decrease and/or substantially prevent exhaust gas flowing to the bypass passage to the HC trap. By doing this, the HC trap temperature decreases due to mass oxygen flow to the bypass passage substantially decreasing and/or being zero.

After $t_4$ and prior to $t_5$, the TWC temperature remains substantially constant and the DFSO continues. The diverter valve remains fully open. As such, exhaust gas does not flow to the bypass passage. In this way, the HC load on the HC trap remains low and the HC trap temperature continues to decrease. However, a rate of the HC trap temperature decrease is low such that the catalyst portion of the HC trap remains active. The rate may be low due to the insulation of the bypass passage and/or the housing of the HC trap. The oxygen mass at the HC trap rapidly decreases as the HC trap no longer has HCs to burn.

At $t_5$, the TWC temperature remains substantially constant, the DFSO continues, and the oxygen mass in the bypass passage is relatively low and/or substantially zero. The diverter valve is fully open and exhaust gas may not enter the bypass passage. As such, the HC load on the HC trap remains relatively low. Additionally, the HC trap temperature continues to slightly decrease due to minor heat losses to an ambient atmosphere.

After $t_5$ and prior to $t_6$, the TWC temperature remains substantially constant and the DFSO continues. The diverter valve remains in the fully open position such that the HC load remains substantially low. The HC trap temperature continues to slightly decrease. Oxygen mass at the HC trap is relatively low and/or substantially zero.

At $t_6$, the TWC catalyst temperature remains substantially constant. The DFSO is deactivated, possibly due to an increased driver demand (e.g., tip-in). The diverter valve remains fully open, the HC load remains relatively low and/or substantially zero, the HC trap temperature continues to slightly decrease, and the oxygen concentration at the HC trap is relatively low and/or substantially zero.

In this way, a diverter valve may be used to redirect exhaust gas from a primary exhaust passage to a bypass passage when a catalyst in the primary exhaust passage is not lit-off. The bypass passage comprises a HC trap, which is smaller than the catalyst in the primary exhaust passage and therefore may be capable of reaching a lit-off temperature more rapidly. The technical effect of having the HC trap in a bypass passage is to control exhaust flow to the bypass passage via the diverter valve when the catalyst is not lit-off such that emissions may not be released to the atmosphere when the catalyst is not lit-off. By doing this, emissions generated during cold-starts may be treated by flowing exhaust gas to the HC trap. Alternatively, when the catalyst is lit-off, exhaust gas may not flow to the bypass passage to increase a longevity of the HC trap.

A method comprising flowing combusted exhaust gas to a particulate filter and hydrocarbon trap in a bypass during a cold start, and the particulate filter positioned inside the main exhaust passage and the hydrocarbon trap positioned outside the main passage. A first example of the method further includes where the particulate filter is located upstream of a diverter valve relative to a direction of exhaust gas flow, the diverter valve is configured to adjust exhaust flow to the bypass in response to engine conditions. A second example of the method, optionally including the first example, further includes where the bypass comprises an inlet physically coupled to an outlet of the particulate filter and a bypass outlet located downstream of the diverter valve. A third example of the method, optionally including the first and/or second examples, further includes where the hydrocarbon trap positioned outside the main exhaust passage includes being positioned in a portion of the bypass where an exterior surface of the bypass is outside of and spaced away from an exterior surface of the main exhaust passage. A fourth example of the method, optionally including one or more of the first through third examples, further includes where the bypass further includes a catalyst at its outlet. A fifth example of the method, optionally including the first through fourth examples, further includes where actuating a diverter valve to a more closed position to increase exhaust gas flow to the bypass and actuating the diverter valve to a more open position to decrease exhaust gas flow to the bypass. A sixth example of the method, optionally including the first through fifth examples, further includes where the hydrocarbon trap comprises catalytic elements located thereon, wherein the hydrocarbon trap further comprises NOx trapping elements.

A system comprising a particulate filter arranged in front of a bypass within a main exhaust passage of an exhaust system, a hydrocarbon trap arranged in a bypass passage outside the main exhaust path, and a single diverter valve positioned downstream of the particulate filter in the main exhaust path, the single diverter valve configured to control exhaust flow through both the particulate filter and the hydrocarbon trap. A first example of the system further includes where a controller with computer-readable instructions for adjusting a position of the diverter valve in response to an engine temperature being less than a threshold engine temperature or a decelerated fuel shut-off event occurring. A second example of the system, optionally including the first example, further includes where the main exhaust passage further comprises a flow diverter located upstream of the particulate filter, and where the flow diverter is concave relative to the particulate filter. A third example of the system, optionally including the first and/or second examples, further includes where the bypass comprises an L-shaped portion located in the main exhaust passage and a U-shaped portion located outside the main exhaust passage. A fourth example of the system, optionally including one or more of the first through third examples, further includes where the bypass is thermally insulated from the main exhaust passage and an ambient atmosphere. A fifth example of the system, optionally including one or more of the first through fourth examples, further includes where the bypass comprises a bypass diameter, the bypass diameter being less than a main exhaust passage diameter, and where a diameter of the hydrocarbon trap is less than the main exhaust passage diameter. A sixth example of the system, optionally including one or more of the first through fifth examples, further includes where the hydrocarbon trap further comprises a catalyst portion configured to treat trapped hydrocarbons prior to the hydrocarbon trap releasing the trapped hydrocarbons, the catalyst portion comprising a combination of one or more of transition metals and precious metals. A seventh example of the system, optionally including one or more of the first through sixth examples, further includes where the bypass comprises a bypass inlet abutted to an outlet of the particulate filter upstream of the diverter valve, and the bypass further comprising a bypass outlet extending through a surface of the main exhaust passage at a location downstream of the diverter valve.

A method for an exhaust, comprising during DFSO, adjusting a valve controlling bypass flow to a hydrocarbon trap and particulate filter in a bypass based on a temperature of the hydrocarbon trap. A first example of the method further includes where adjusting in response to the temperature of the hydrocarbon trap being less than a threshold upper temperature includes actuating the valve to a more closed position to increase an exhaust backpressure in a main exhaust passage, forcing exhaust gas to flow through the particulate filter at a location upstream of the valve in the main exhaust passage, the exhaust gas further flowing through the hydrocarbon trap located outside the main exhaust passage before returning to the main exhaust passage at a location downstream of the valve. A second example of the method, optionally including the first example, further includes where adjusting in response to the temperature of the hydrocarbon trap being greater than the threshold upper temperature includes actuating the valve to a more open position to decrease exhaust backpressure, and to decrease exhaust gas flow from the main exhaust passage to the bypass having the hydrocarbon trap. A third example of the method, optionally including the first and/or second examples, further includes where a particulate filter diameter and a hydrocarbon trap diameter are less than a main exhaust passage diameter, the valve configured to flow more exhaust gas from the main exhaust passage to the bypass when in a more closed position compared to a more open position. A fourth example of the method, optionally including one or more of the first through third examples, further includes where the temperature of the hydrocarbon trap is estimated based on one or more of a first temperature sensor and second temperature sensor, where the first and second temperature sensor are located in a portion of the bypass outside of a main exhaust passage housing the valve. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   flowing combusted exhaust gas to a particulate filter and hydrocarbon trap in a bypass during a cold start;
   the particulate filter positioned inside a main exhaust passage and the hydrocarbon trap positioned outside the main exhaust passage, wherein the bypass comprises an L-shaped portion located in the main exhaust passage and a U-shaped portion located outside of the main exhaust passage, and wherein the particulate filter is positioned in the L-shaped portion and wherein a hydrocarbon trap is positioned within the U-shaped portion.

2. The method of claim 1, wherein the particulate filter is located upstream of a diverter valve relative to a direction of exhaust gas flow, the diverter valve is configured to adjust exhaust flow to the bypass in response to engine conditions.

3. The method of claim 1, wherein the bypass comprises an inlet physically coupled to an outlet of the particulate filter and a bypass outlet located downstream of the diverter valve.

4. The method of claim 1, wherein the hydrocarbon trap positioned outside the main exhaust passage includes being positioned in a portion of the bypass where an exterior surface of the bypass is outside of and spaced away from an exterior surface of the main exhaust passage.

5. The method of claim 1, wherein the bypass further includes a catalyst at its outlet.

6. The method of claim 1, further comprising actuating a diverter valve to a more closed position to increase exhaust gas flow to the bypass and actuating the diverter valve to a more open position to decrease exhaust gas flow to the bypass.

7. The method of claim 1, where the hydrocarbon trap comprises catalytic elements located thereon, wherein the hydrocarbon trap further comprises NOx trapping elements.

8. A system comprising
   a particulate filter arranged in front of a bypass within a main exhaust passage of an exhaust system;
   a hydrocarbon trap arranged in a bypass passage outside the main exhaust path; and
   a single diverter valve positioned downstream of the particulate filter in the main exhaust path, the single diverter valve configured to control exhaust flow through both the particulate filter and the hydrocarbon trap, wherein the bypass comprises an L-shaped portion located in the main exhaust passage and a U-shaped portion located outside of the main exhaust passage, and wherein the particulate filter is positioned in the L-shaped portion and wherein a hydrocarbon trap is positioned within the U-shaped portion.

9. The system of claim 8, further comprising a controller with computer-readable instructions for adjusting a position of the diverter valve in response to an engine temperature being less than a threshold engine temperature or a decelerated fuel shut-off event occurring.

10. The system of claim 8, wherein the main exhaust passage further comprises a flow diverter located upstream of the particulate filter, and where the flow diverter is concave relative to the particulate filter.

11. The system of claim 8, wherein the bypass is thermally insulated from the main exhaust passage and an ambient atmosphere.

12. The system of claim 8, wherein the bypass comprises a bypass diameter, the bypass diameter being less than a main exhaust passage diameter, and where a diameter of the hydrocarbon trap is less than the main exhaust passage diameter.

13. The system of claim 8, wherein the hydrocarbon trap further comprises a catalyst portion configured to treat trapped hydrocarbons prior to the hydrocarbon trap releasing the trapped hydrocarbons, the catalyst portion comprising a combination of one or more of transition metals and precious metals.

14. The system of claim 8, wherein the bypass comprises a bypass inlet abutted to an outlet of the particulate filter upstream of the diverter valve, and the bypass further comprising a bypass outlet extending through a surface of the main exhaust passage at a location downstream of the diverter valve.

15. A method for an exhaust, comprising
during a deceleration fuel shut-off, adjusting a valve controlling bypass flow to a hydrocarbon trap and particulate filter in a bypass based on a temperature of the hydrocarbon trap, wherein the bypass comprises an L-shaped portion located in a main exhaust passage and a U-shaped portion located outside of the main exhaust passage, and wherein the particulate filter is positioned in the L-shaped portion and wherein the hydrocarbon trap is positioned within the U-shaped portion.

16. The method of claim 15, wherein adjusting in response to the temperature of the hydrocarbon trap being less than a threshold upper temperature includes actuating the valve to a more closed position to increase an exhaust backpressure in a main exhaust passage, forcing exhaust gas to flow through the particulate filter at a location upstream of the valve in the main exhaust passage, the exhaust gas further flowing through the hydrocarbon trap located outside the main exhaust passage before returning to the main exhaust passage at a location downstream of the valve.

17. The method of claim 16, wherein adjusting in response to the temperature of the hydrocarbon trap being greater than the threshold upper temperature includes actuating the valve to a more open position to decrease exhaust backpressure, and to decrease exhaust gas flow from the main exhaust passage to the bypass having the hydrocarbon trap.

18. The method of claim 15, wherein a particulate filter diameter and a hydrocarbon trap diameter are less than a main exhaust passage diameter, the valve configured to flow more exhaust gas from the main exhaust passage to the bypass when in a more closed position compared to a more open position.

19. The method of claim 15, wherein the temperature of the hydrocarbon trap is estimated based on one or more of a first temperature sensor and second temperature sensor, where the first and second temperature sensor are located in a portion of the bypass outside of a main exhaust passage housing the valve.

20. A method comprising:
flowing combusted exhaust gas to a particulate filter in a bypass during a cold start;
the particulate filter positioned inside a main exhaust passage and the bypass positioned outside the main passage with a valve downstream of the particulate filter also wholly within the main exhaust passage, wherein the bypass comprises an L-shaped portion located in the main exhaust passage and a U-shaped portion located outside of the main exhaust passage, and wherein the particulate filter is positioned in the L-shaped portion and wherein a hydrocarbon trap is positioned within the U-shaped portion.

* * * * *